US006567249B1

(12) United States Patent
Berndt

(10) Patent No.: US 6,567,249 B1
(45) Date of Patent: May 20, 2003

(54) TRANSFORMER WITH ELECTRICAL ISOLATION PROTECTION AND POWER SUPPLY UNIT OR VOLTAGE CONVERTER WITH A TRANSFORMER OF THIS TYPE

(75) Inventor: Dietmar Berndt, Lüdenscheid (DE)

(73) Assignee: Werner Truck GmbH & Co. KG, Halver (DE)

( * ) Notice: Subject to any disclaimer, the term of this patent is extended or adjusted under 35 U.S.C. 154(b) by 0 days.

(21) Appl. No.: 09/575,865

(22) Filed: May 19, 2000

(30) Foreign Application Priority Data

May 21, 1999 (DE) ........................................ 199 23 360

(51) Int. Cl.[7] ................................................. H02H 7/04

(52) U.S. Cl. ............................. 361/38; 361/37; 336/30; 336/179

(58) Field of Search .............................. 361/35, 37, 41, 361/38, 103; 336/30, 179

(56) References Cited

U.S. PATENT DOCUMENTS

| | | | | | |
|---|---|---|---|---|---|
| 2,926,343 | A | * | 2/1960 | Postal | 336/179 |
| 3,930,186 | A | * | 12/1975 | Sekiya et al. | 361/35 |
| 5,182,427 | A | * | 1/1993 | McGaffigan | 219/10.75 |
| 5,577,316 | A | * | 11/1996 | Kaelin | 29/606 |

* cited by examiner

*Primary Examiner*—Ronald W. Leja
(74) *Attorney, Agent, or Firm*—Martin A. Farber

(57) ABSTRACT

A invention relates to a transformer having a primary coil and a secondary coil, with a ferromagnetic core inserted in a coil former. The alternating current resistance of the primary coil (3) drops on reaching a triggering temperature (TC) which lies above the operating temperature but below the softening temperature (TW) of the coil former (6) and/or insulation of coil winding (3, 4). The coil core (5) may consist at least partially of a material with a magnetic permeability which drops when the triggering temperature (TC) is exceeded.

20 Claims, 3 Drawing Sheets

TRANSFORMER WITH ELECTRICAL ISOLATION PROTECTION AND POWER SUPPLY UNIT OR VOLTAGE CONVERTER WITH A TRANSFORMER OF THIS TYPE

FIELD AND BACKGROUND OF THE INVENTION

The invention relates to a transformer having a primary coil and a secondary coil, with a ferromagnetic core inserted in a coil former.

Transformers of this type are known in the art and serve the purpose of transforming alternating current. The field of application of such transformers covers AC/DC or DC/DC converters and power supply units in particular. In such applications, it is of considerable importance to isolate the input circuit and output circuit galvanically from each other. The isolation of the galvanic regions in most cases consists of plastics material. This plastics material is capable of withstanding certain thermal loads. In the event of a fault, however, the temperature of the transformer may rise to a value at which the coil former or the winding insulation melts. The short-circuit then occurring between the primary winding and the secondary winding destroys the galvanic isolation.

To avoid such destruction of the galvanic isolation, it has been proposed in the prior art to monitor the temperature of the transformer housings by thermocouples. A common precautionary measure is also to introduce a fuse into the primary circuit.

SUMMARY OF THE INVENTION

The invention is based on the object of developing a transformer of the generic type to improve the electrical isolation protection.

According to the invention the alternating current resistance of the primary coil decreases on reaching a triggering temperature which lies above the operating temperature of the transformer but below the softening temperature of the coil former and/or insulation of the coil winding. For this purpose, the coil core preferably consists at least partially of a material with a magnetic permeability which drops when the triggering temperature is exceeded. For this purpose, the core preferably consists of a ferrite. This ferrite core is to have at least one region in which the Curie temperature is lower than the softening temperature of the coil core and/or coil insulation. If the temperature of the coil core rises below the Curie temperature, the permeability of the coil core remains virtually constant or increases slightly. On reaching the Curie temperature, the relative permeability of the material drops abruptly to the value 1. This abrupt drop takes place over only a few degrees. The coil core preferably comprises two core parts. In this case it is adequate if one of the two core parts consists of a material in which the relative permeability changes abruptly at the temperature mentioned above. It is adequate if only a subregion of the core has these properties. The Curie temperature of the region or of the entire core preferably lies between 120 and 220° C. The invention also relates to a power supply unit or a voltage converter with a transformer in which the alternating current resistance of the primary coil decreases on reaching a triggering temperature which lies above the operating temperature, this triggering temperature lying below the softening temperature of the coil former and/or insulation of the coil winding. In this case, a fuse is connected in the primary circuit, the triggering current of the said fuse being lower than the current flowing through the primary coil when the triggering temperature is exceeded. In a preferred embodiment, the voltage converter is a DC/DC converter, in which the alternating current is generated by a switching IC.

BRIEF DESCRIPTION OF THE DRAWINGS

Exemplary embodiments of the invention are explained below with reference to the attached drawings, in which.

DETAILED DESCRIPTION OF THE PREFERRED EMBODIMENT

Figure 1:
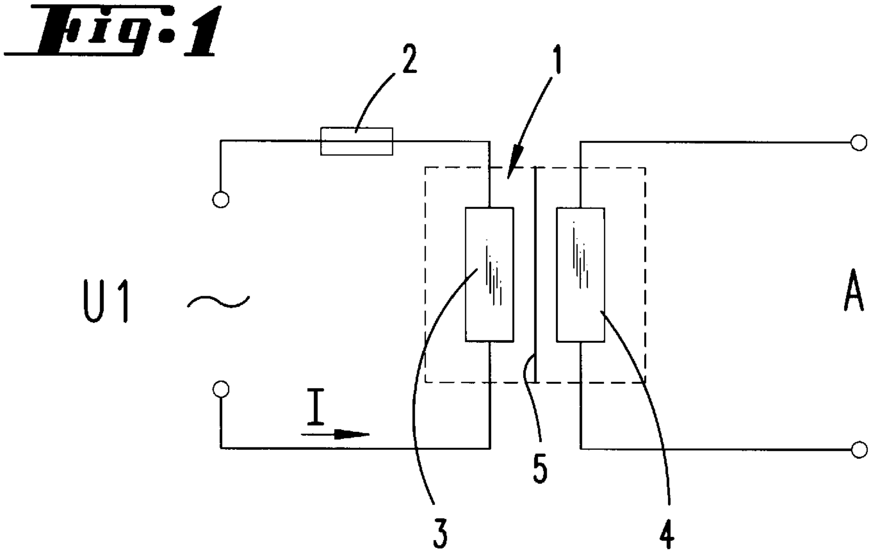
FIG. 1 shows a first exemplary embodiment of the invention in schematic representation.
Figure 2:
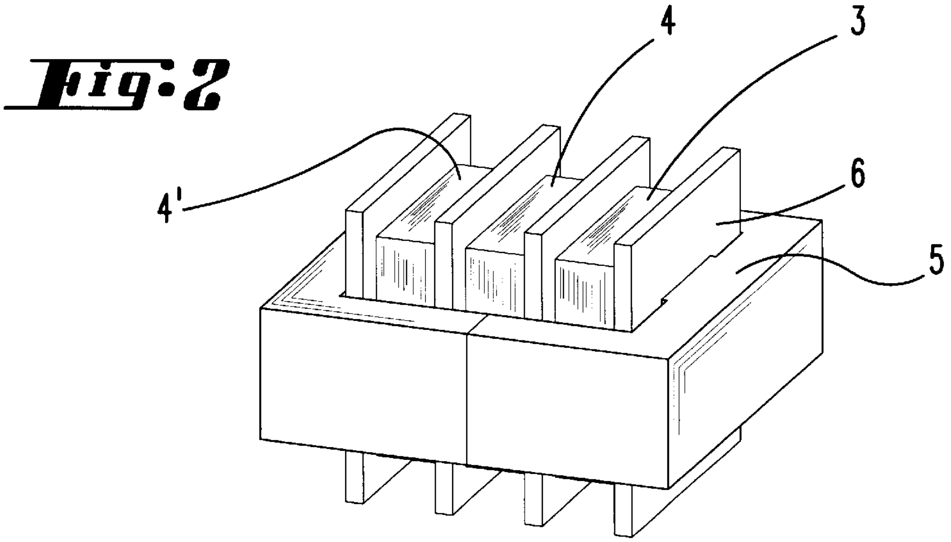
FIG. 2 shows a transformer.

The circuit arrangement represented in FIG. 1 comprises a transformer 1 with primary winding 3 and secondary winding 4. The two windings 3, 4 are located, as represented in FIG. 2, on a common coil former 6, in which a coil core 5 is fitted. The coil core 5 comprises two individual E-shaped coil cores 5', 5". The two coil cores 5', 5" have been pushed into the coil former 6 towards each other in such a way that an air gap 8 is defined between the cross-pieces of the E. The said air gap is not necessary. In the primary circuit, in which the current I flows, there is a fuse 2. The primary winding 3 is under a voltage U1. At the secondary winding 4, a secondary voltage A can be tapped.

The transformer represented in FIG. 2 has two secondary windings 4, 4'.

Figure 3:
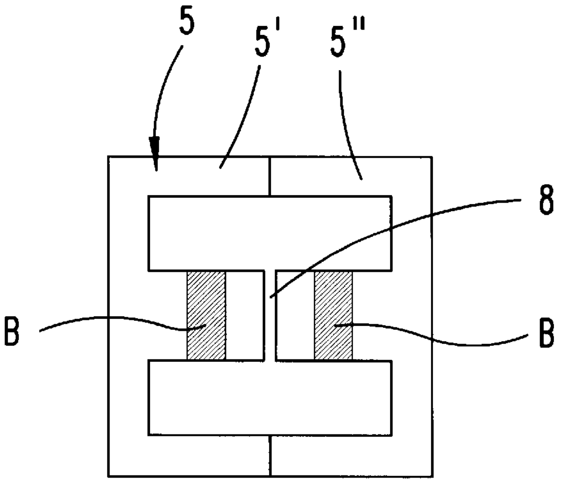
FIG. 3 shows a coil core.

The coil core, which is represented in FIG. 3, has in each of its two core halves 5', 5" a region B in which the material has a relative magnetic permeability which is significantly greater than 1 at the operating temperature TA of the transformer. The Curie temperature TC of the regions B is chosen such that it is lower than the softening temperature TW of coil former 6 and of the insulation of the primary or secondary winding. In a preferred exemplary embodiment (not represented), the core 5 or one of the two core halves 5', 5" is produced from a material of which the Curie temperature TC lies between the operating temperature TA and the softening temperature TW of the transformer 1. The Curie temperature TC preferably lies approximately around 130° C. This temperature lies distinctly below that temperature at which the plastics material of the coil former 6 softens. This temperature is, for example, around 220° C.

In practice, for cost reasons on the one hand and assembly reasons on the other hand, the entire coil core represented in FIG. 3, and not just a subregion B, will be produced from the material in question.

Figure 4:
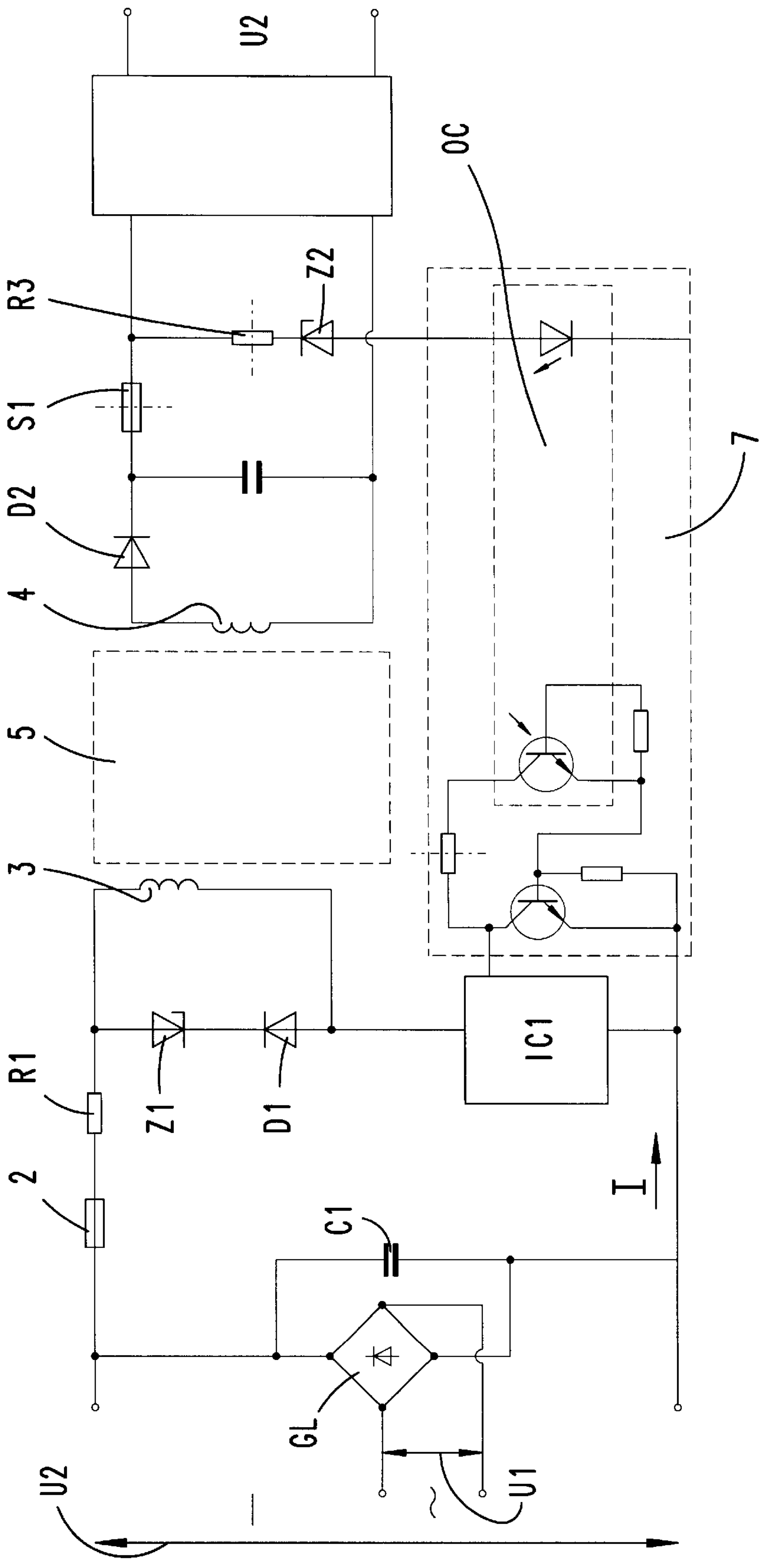
FIG. 4 shows a second exemplary embodiment of the invention.

The exemplary embodiment represented in FIG. 4 concerns an AC/(DC)/DC converter. On the input side, the converter forms a rectifier GL with a damping capacitor C1. An alternating voltage U1 may be connected to the rectifier GL. This voltage is rectified by the rectifier GL and damped in a known way by means of the capacitor C1. A direct voltage U2 may also be applied directly to the capacitor C1.

The primary circuit is located at the capacitor C1. In this primary circuit, in which the primary winding 3 of a transformer is located, there are a fuse 2, a low-impedance current-limiting resistor R1 and a switching IC IC1. The switching IC IC1 supplies an alternating voltage, the frequency of which may be fixed or else may be selectable. The amplitude or the pulse width of the alternating voltage supplied by the IC is determined by a control circuit 7. Between the two terminals of the primary winding 3 there are also located a diode D1 and a Zener diode 21.

In the secondary circuit of the secondary winding 4 there are located a diode D2 and a fuse S1. The secondary direct voltage, present at the diode D2, is tapped via a resistor R3 and a Zener diode Z2 in series with the latter and is fed to an optocoupler OC. The optocoupler OC is connected to the control input of the switching IC IC1. The alternating voltage supplied by the IC is regulated via the optocoupler OC in a known way, by means of a pulse width control or an amplitude control, so that the direct voltage U2 on the primary side remains constant.

In the event of a fault in which, for example, the IC is destroyed and a direct current flows through the primary winding 3, the primary circuit current I increases until it exceeds the triggering current of the fuse 2. The fuse 2 then blows. The circuit is in a safe state.

In the event of a fault in which either, in the case of the exemplary embodiment according to FIG. 1, the alternating voltage U1 assumes an excessively high frequency or voltage or, in the case of the exemplary embodiment according to FIG. 4, the integrated circuit IC1 oscillates in an uncontrolled manner, the voltage present at the primary circuit coil 3 assumes high values. This leads to the temperature of the transformer 1 rising due to the associated higher losses. The temperature then rises above the normal operating temperature TA and reaches the Curie temperature TC of the material of the coil core 5. On exceeding the Curie temperature, the relative permeability of the material (ferrite) drops to virtually 1. This means that the core no longer contributes to the concentration of the magnetic flux. The consequence of the abrupt drop in relative permeability resulting from the temperature increase is a significant reduction in the inductance of the windings. Consequently, the primary winding opposes the alternating current present at it with a reduced resistance. Not only the imaginary part but also the real part of the resistance of the coil is significantly reduced. This means a simultaneous increase in the current flowing through the fuse 2. This current increases beyond the triggering current, so that the fuse blows.

The abrupt dropping of the permeability on reaching a temperature of approximately 130° C. also influences the transfer behaviour between the primary side and the secondary side. The power transfer from the primary side to the secondary side is reduced considerably.

The serious increase in magnetic resistance, by a factor of 200 to 1000, when the Curie temperature TC is exceeded, reduces the magnetic flux considerably, so that the induced voltage drops on the secondary side and a power limit also occurs there.

Figure 5:
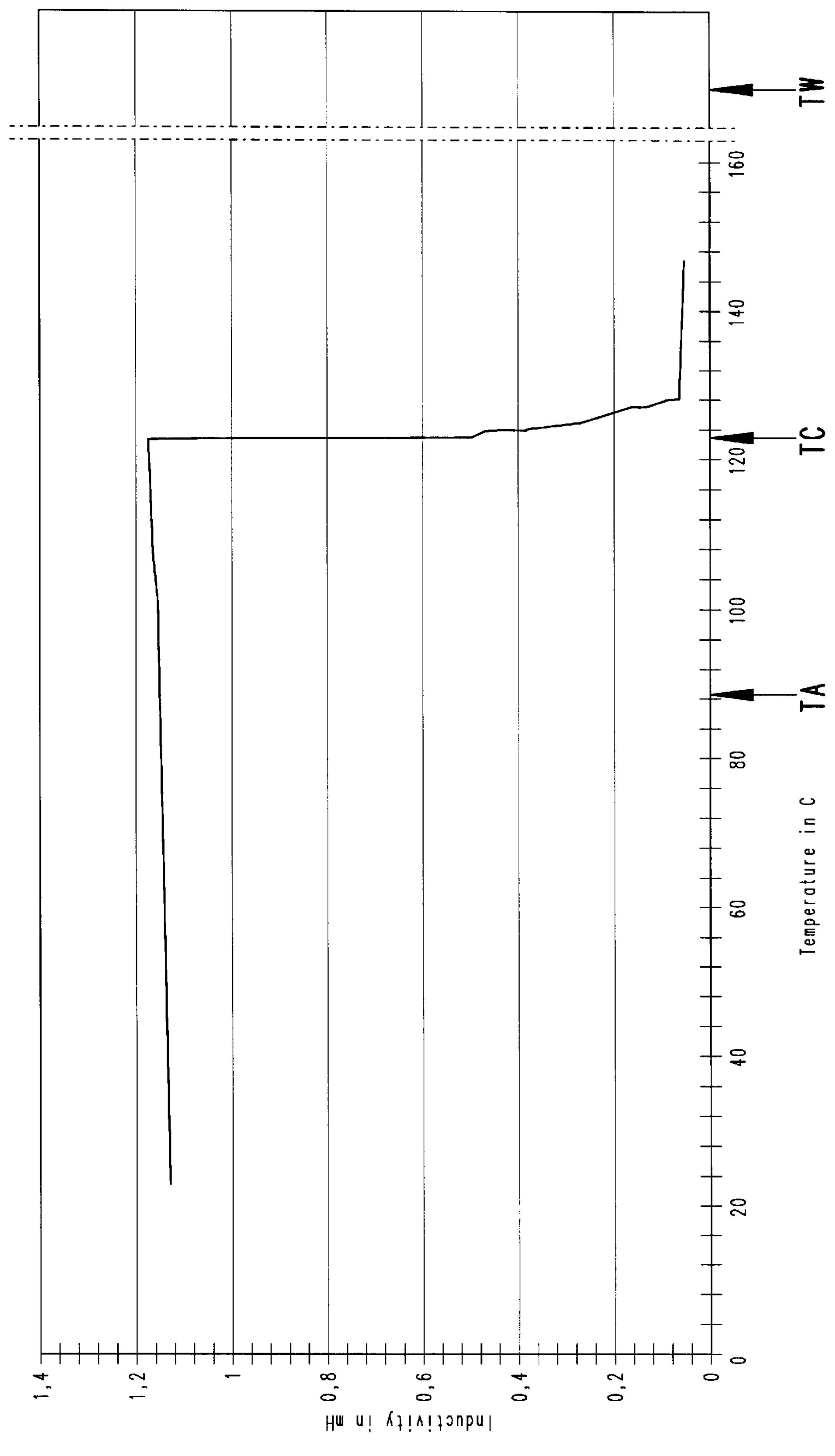
FIG. 5 shows a diagram of the inductance of a transformer in relation to the temperature.

The variation in the inductance of the primary coil of a transformer according to the invention is represented schematically in FIG. 5. In this figure, TA indicates the operating temperature. TC denotes the Curie temperature and TW denotes the melting temperature of the coil housing or winding insulation.

I claim:

1. A voltage converter with a transformer which has a primary coil and a secondary coil, having a ferromagnetic core which is inserted in a coil former, with the impedance of the primary coil (3) falling on reaching a tripping temperature, which is above the operating temperature and is below the softening temperature (TW) of the coil former (6) and/or insulation of the coil winding (3, 4), such that a protective device (fuse) (2) which is connected in the circuit of the primary coil trips (blows) in the event of the tripping temperature being exceeded as a result of the increased current (3) flowing through the primary coil.

2. Voltage converter according to claim 1, wherein the ferromagnetic core (5) is made at least partially of a material with a magnetic permeability which drops when a triggering temperature is exceeded.

3. Voltage converter according to claim 2, wherein the ferromagnetic core (5) is a ferrite core and has at least one region (B) in which a Curie temperature is lower than the softening temperature of the coil former (6) and/or coil insulation.

4. Voltage converter according to claim 2, wherein the ferromagnetic core (5) comprises two core parts (5', 5") and one or both core parts (5', 5") has or have entirely or in certain regions a Curie temperature which is lower than the softening temperature of coil former (6) and/or coil insulation.

5. Voltage converter according to claim 1, wherein a Curie temperature lies between 100 and 220° C.

6. Voltage converter according to claim 5, wherein the Curie temperature lies between 120 and 180° C.

7. Voltage converter according to claim 1, further comprising a current-limiting fuse connected in series with the primary coil.

8. Voltage converter with a transformer (1) according to claim 7, wherein a triggering current of the current limiting fuse (2) is lower than a current (I) flowing through the primary coil (3) when a triggering temperature is exceeded.

9. Voltage converter according to claim 7, wherein the transformer is subjected to an alternating voltage by a switching IC.

10. Voltage converter of claim 1 wherein said transformer is connected to a voltage supply for an appliance.

11. Voltage converter of claim 10 wherein the appliance is connected to the secondary coil.

12. Power supply unit or voltage converter with a transformer (l)having a primary coil and a secondary coil, with a coil core inserted in a coil former, wherein alternating current resistance of the primary coil (3) drops on reaching a triggering temperature which lies above operating temperature but below softening temperature (TW) of the coil former (6) and/or insulation of the primary or secondary coil (3, 4), a current-limiting fuse connected in series with the primary coil, wherein a triggering current of the current limiting fuse (2) is lower than a current (I) flowing through the primary coil (3) when the triggering temperature is exceeded.

13. Power supply unit or voltage converter according to claim 12, wherein the coil core (5) is made at least partially of a material with a magnetic-permeability which drops when the triggering temperature is exceeded.

14. Power supply unit or voltage converter according to claim 13, wherein the coil core (5) is a ferrite core and has at least one region (B) in which a Curie temperature is lower than the softening temperature of the coil former (6) and/or coil insulation.

15. Power supply unit or voltage converter according to claim 13, wherein the coil core (5) comprises two core parts (5', 5") and one or both core parts (5', 5") has or have entirely or in certain regions a Curie temperature which is lower than the softening temperature of coil former: (6) and/or coil insulation.

16. Voltage converter according to claim 12, wherein a Curie temperature lies between 100 and 220° C.

17. Voltage converter according to claim 16, wherein the Curie temperature lies between 120 and 180° C.

18. Power supply unit or voltage converter according to claim 12, wherein the transformer is subjected to an alternating voltage by a switching IC.

19. Power supply unit or voltage converter according to claim 12, wherein said transformer is connected to a voltage supply for an appliance.

20. Power supply unit or voltage converter according to claim 19 wherein the appliance is connected to the secondary coil.

* * * * *